March 16, 1954   E. J. BERSCHEIT   2,672,123
ANIMAL RESTRAINING DEVICE
Filed March 3, 1952

Ernest J. Berscheit
INVENTOR.

BY *Clarence A. O'Brien*
*and Harvey B. Jacobson*
Attorneys

Patented Mar. 16, 1954

2,672,123

UNITED STATES PATENT OFFICE 2,672,123

ANIMAL RESTRAINING DEVICE

Ernest J. Berscheit, Grey Eagle, Minn.

Application March 3, 1952, Serial No. 274,583

3 Claims. (Cl. 119—28)

This invention relates generally to a device for preventing animals standing with their hind hoofs or feet in the gutters normally provided at the entrances to animal stalls, and more particularly to a restraining device for installation in stall gutters of barns used for sheltering cows.

Some cows have the tendency of backing out of their stalls and standing with their hind feet in the gutter at the entrance to their stall with the result that their hind feet become soiled and contaminated from the foreign matter of the water flowing through the gutter. Inasmuch as the udders of cows rest on or touch their hind feet when they lie down, their udders also become soiled and contaminated due to the contact with the hind feet of the cows. This condition not only necessitates the washing of the cow's udder and teats but is frowned upon by the Department of Health inspectors who steadily check the conditions under which the milk supplied for a district is produced.

The primary object of this invention is to provide a improved animal restraining device for insertion in a stall gutter which will break a cow of the habit of standing in a stall gutter without injuring the animal.

Another object of this invention is to provide an improved animal restraining device adapted for installation in a stall gutter which may be stepped upon by an animal without damage thereto.

Another object of this invention is to provide an improved grate for animal stall gutters which is of simplified construction whereby it may be quickly and economically manufactured of conventional materials.

Another object of this invention is to provide an improved grate for insertion in animal stall gutters, said grate being adapted to snugly fit in stall gutters of various widths.

A further object of this invention is to provide an improved animal restraining device for insertion in stall gutters, said device being amply strong and durable, and at the same time readily portable and may be conveniently associated with or removed from a stall gutter and requires no hold-down means.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 2:
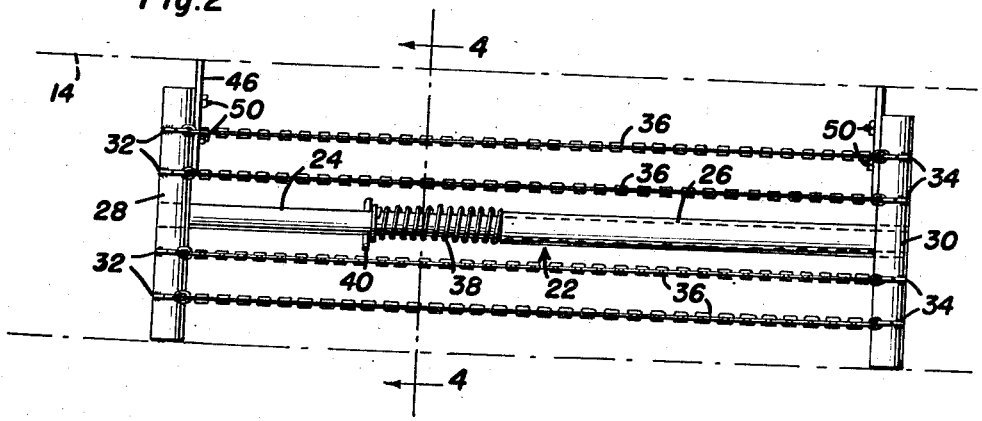
Figure 2 is an enlarged top plan view of the animal restraining device of Figure 1, the outline of the stall gutter being illustrated by broken lines.
Figure 3:
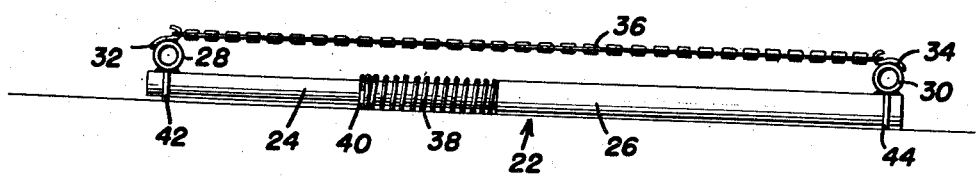
Figure 4:
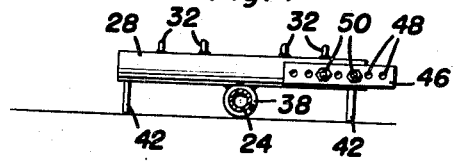

Figure 3 is a side elevational view of the animal restraining device of Figure 2 and showing the relationship of the various elements thereof including the manner in which flexible members are secured to end portions of the device, and Figure 4 is a transverse vertical sectional view taken substantially on the plane indicated by the section line 4—4 of Figure 2 and showing the manner in which an extension is adjustably secured to an end frame member in order that the restraining device may snugly fit various widths of stall gutters.

Similar characters of reference designate similar or identical elements and portions throughout the specification and throughout the different views of the drawings.

Figure 1:
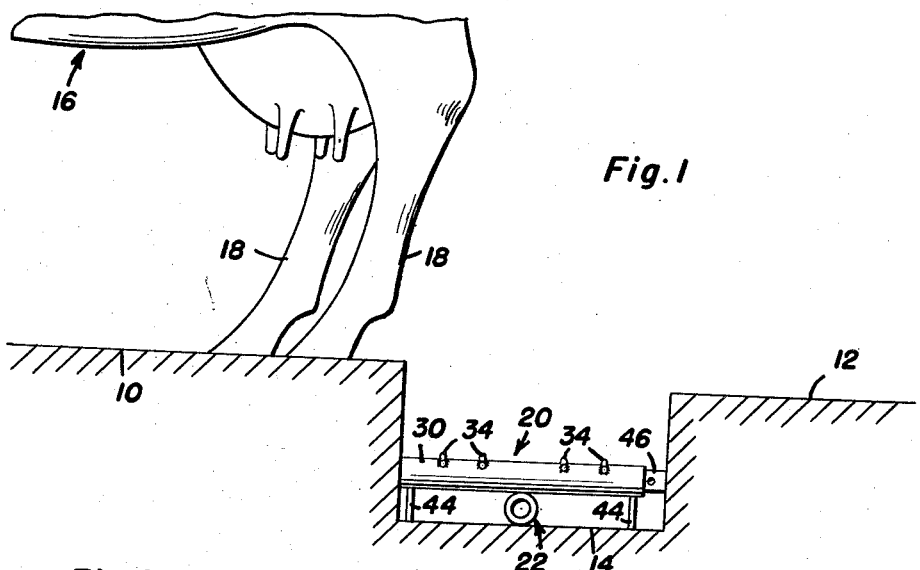
Figure 1 is a transverse vertical sectional view through a conventional dairy barn having a gutter at the entrance to a stall, said gutter being illustrated with the improved animal restraining device, which is the subject of this invention, installed therein.

Referring now to the drawings in detail, it will be seen that there is illustrated in Figure 1 a portion of a floor of a conventional dairy barn, said floor including a stall portion 10 which is separated from a runway 12 by a gutter 14. Standing on the stall portion 10 is the rear of a cow 16 whose rear legs 18 are illustrated as being positioned adjacent the gutter 14. Disposed within the gutter 14 is the improved animal restraining device, which is the subject of this invention, the device being referred to by reference numeral 20 and intended to discourage the cow 16 from standing with its hind legs 18 in the gutter 14.

The animal restraining device 20 is in the form of an elongated grate and includes a longitudinally extending frame rail 22. The frame rail 22 consists of first and second telescope members 24 and 26, the telescope member 24 being of smaller diameter and telescoped within the telescope member 26. Secured to the upper side of the member 24 at the free end thereof is a transversely extending end frame member 28 which is in spaced parallel relation to a similar end frame member 30 secured to the free end of the telescope member 26. It will be seen that the frame rail 22 and the end frame members 28 and 30 form an I-shaped frame of varying length.

Rigidly secured to the upper surface of the end frame member 28 in spaced parallel relation as by welding is a plurality of hooks 32 which face outwardly from the general area of the restraining device. Secured to the upper surface of the end frame member 30 in alignment with the hooks 32 are a plurality of similar hooks 34 which also face away from the general area of the restraining device. Extending between the end frame members 28 and 30 in spaced parallel relation and secured thereto by engagement with their respective hooks 32 and 34 are a plurality of elongated flexible members 36 which are in the form of chains.

In order that the flexible members 36 may be maintained under tension, the telescoped members 24 and 26 forming the frame rail 22 are resiliently urged apart by a coil spring 38 carried by the smaller telescoped member 24 and abutting the inner end of the telescoped member 26. The other end of the coil spring 38 abuts the transversely extending cotter pin 40 carried by the telescoped member 24 intermediate its ends. It will be understood that the compression of the coil spring 38 is such that the flexible members 36 are normally maintained under tension, but permits telescoping of the telescoped members 24 and 26 upon the stepping of an animal on any of the flexible members 36 in order that the flexible members 36 may give in lieu of being broken due to the weight of the animal.

The end frame members 28 and 30 and their associated flexible members 36 are supported in spaced relation from the bottom of a stall gutter such as the gutter 14 of Figure 1 by the frame rail 22 resting on the bottom thereof. Inasmuch as the frame rail 22 is circular in cross section and positioned centrally of the width of the animal restraining device 20, it is obvious that the device will have a tendency to tip if an animal should step on one side. In order to prevent tipping of the restraining device 20, the end frame members 28 and 30 have vertically extending rods 42 and 44, respectively, extending downwardly from their undersides adjacent their ends. It will be understood that the rods 42 and 44 are of such length so as to permit the frame rail 22 to rest upon the bottom of the gutter 14 and at the same time maintain the end frame members 28 and 30 in a horizontal plane.

Inasmuch as stall gutters are of different widths in different dairy barns, the end frame members 28 and 30 are each provided with an extension 46 in the form of a flat bar having a plurality of aligned apertures 48 therein. It is intended that the extensions 46 be adjustably secured to the end frame members 28 and 30 by selectively positioning said apertures 48 over bolts 50 carried by the end frame members and secured thereto by nuts threadedly engaged thereon. By adjusting the extensions 46 so that the combined length of the extending portions of each extension 46 and its respective end frame member is substantially equal to the width of the gutter for which the animal restraining device is intended, the animal restraining device will snugly fit between the side walls of the gutter and be prevented from shifting therein.

It will be understood that the spacing of the flexible members 36 are such that when an animal steps backwardly into the gutter 14, its hind feet will engage one of the flexible members 36 and annoy the animal. Inasmuch as the flexible member 36 will give upon being stepped upon by the animal, it is impossible for the animal to be injured by engagement with the portion of the restraining device 20. However, the stepping upon a flexible support will both annoy and unnerve the animal and, therefore, break it of the habit of standing in the gutter 14.

The operation of this device will be understood from the foregoing description of the details thereof, taken in connection with the above recited objects and the drawings. Further description would appear to be unnecessary.

Minor modifications of the device varying in minor details from the embodiment of the device illustrated and described here, may be resorted to without departure from the spirit and scope of this invention, as defined in the appended claims.

Having described the invention, what is claimed as new is:

1. In combination with an elongated stall gutter, an animal restraining device, said stall gutter having spaced side walls, said animal restraining device extending longitudinally filling the space therebetween, said animal restraining device including a pair of longitudinally spaced end frame members, said end frame members extending transversely of said stall gutter, a frame rail extending between and secured to said end frame members intermediate their ends, said frame rail being formed of a pair of telescoped members, individual articulated members extending between said end frame members and having ends secured to said end frame members, spring means carried by one of said telescoped members urging said telescoped members apart to resiliently tension said articulated members, said end frame members being provided with adjustable extensions whereby said end frame members may be adjusted to a length equal to the spacing of said side walls.

2. For use in a stall gutter an animal restraining device comprising a pair of longitudinally spaced end frame members, a longitudinally extending frame rail having opposite ends secured to said end frame members intermediate ends thereof, said frame rail being intended to rest on a bottom of a stall gutter and having ends underlying said end frame members and forming central supports for said end frame members, depending pins carried by ends of said end frame member for engaging a bottom of a stall gutter in spaced relation to said frame rail, said frame rail including a pair of telescoped members, spring means carried by one of said frame members for urging said telescoped member and said end frame members apart, individual flexible members extending between and connected to said end frame members, said flexible members being resiliently tensioned by said spring means, said flexible members being in vertically spaced relation relative to said frame rail.

3. For use in a stall gutter an animal restraining device, said animal restraining device comprising a pair of longitudinally spaced end frame members, a longitudinally extending frame rail having opposite ends secured to said end frame members intermediate ends thereof, said frame rail being intended to rest in a bottom of a stall gutter and having ends underlying said end frame members and forming central supports for said end frame members, depending pins carried by ends of said end frame member for engaging a bottom of a stall gutter spaced relation to said frame rail, said frame rail including a pair of telescoped members, spring means carried by one of said frame members for urging said telescoped member and said end frame members apart, individual flexible members extending between and connected to said end frame members, said flexible members being resiliently tensioned by said spring means, said flexible members being in vertically spaced relation relative to said frame rail, extensions adjustably secured to said end frame members for varying the effective width of the animal restraining device, said extension extending transversely of said frame rail and being engageable with a vertical wall for a stall gutter.

ERNEST J. BERSCHEIT.

References Cited in the file of this patent

UNITED STATES PATENTS

| Number | Name | Date |
|---|---|---|
| 730,794 | Perkins | June 9, 1903 |
| 887,676 | Malone | May 12, 1908 |
| 1,055,097 | Stephenson et al. | Mar. 4, 1913 |
| 1,062,499 | Pielert | May 20, 1913 |
| 1,366,384 | Hotz | Jan. 25, 1921 |
| 2,512,740 | Evans | June 27, 1950 |

FOREIGN PATENTS

| Number | Country | Date |
|---|---|---|
| 389,273 | Great Britain | Mar. 16, 1933 |